(12) United States Patent
Asakura et al.

(10) Patent No.: US 6,616,121 B2
(45) Date of Patent: Sep. 9, 2003

(54) CONTROL SYSTEM FOR SERVO VALVE AND CONTROL METHOD THEREFOR, AND COMBINED-CYCLE ELECTRIC-POWER GENERATING PLANT AND GAS TURBINE PLANT

(75) Inventors: Kazuyasu Asakura, Hitachi (JP); Shouei Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/210,033

(22) Filed: Aug. 2, 2002

(65) Prior Publication Data

US 2002/0179872 A1 Dec. 5, 2002

Related U.S. Application Data

(62) Division of application No. 09/793,201, filed on Feb. 26, 2001.

(30) Foreign Application Priority Data

May 31, 2000 (JP) .................................. 2000-162827

(51) Int. Cl.⁷ .............................................. F16K 31/02
(52) U.S. Cl. ................... 251/129.04; 318/564; 318/565
(58) Field of Search .................. 251/129.04; 318/564, 318/565

(56) References Cited

U.S. PATENT DOCUMENTS

| | | | | | |
|---|---|---|---|---|---|
| 3,469,162 A | * | 9/1969 | Goslin | ......................... | 318/564 |
| 4,369,401 A | * | 1/1983 | Fayfield et al. | .............. | 318/565 |
| 4,594,537 A | * | 6/1986 | Arifian et al. | .............. | 318/564 |
| 4,760,491 A | * | 7/1988 | Hurley | ................... | 251/129.09 |
| 5,214,913 A | * | 6/1993 | Tani et al. | .................. | 318/564 |

FOREIGN PATENT DOCUMENTS

JP         9-126351         5/1997

* cited by examiner

Primary Examiner—Gene Mancene
Assistant Examiner—Eric Keasel
(74) Attorney, Agent, or Firm—Kenyon & Kenyon

(57) ABSTRACT

An object of the present invention is to provide a control system and a control method for servo valve which can stably continue to control a servo valve when a break occurs in servo coils of a servo valve having a plurality of servo coils.

In the present invention, voltages of a plurality of servo coils 3A, 3B, 3C are detected by wire break detecting means individually provided to servo amplifiers 2A, 2B. 2C. The servo amplifiers 2A, 2B. 2C performs wire break detection and wire break compensation.

11 Claims, 12 Drawing Sheets

CONTROL SYSTEM FOR SERVO VALVE AND CONTROL METHOD THEREFOR, AND COMBINED-CYCLE ELECTRIC-POWER GENERATING PLANT AND GAS TURBINE PLANT

This application is a division of application Ser. No. 09/793,201 filed Feb. 26, 2001.

BACKGROUND OF THE INVENTION

The present invention relates to a control system for servo valve which controls opening degree of the servo valve having a plurality of servo coils used in the field of chemical plant or electric-power generating plant and a control method for the servo valve, and a combined-cycle electric-power plant and a gas turbine plant having the control system for servo valve.

DESCRIPTION OF THE RELATED ART

In general, in the field of chemical plant or electric-power generating plant, a servo valve having a plurality of servo coils is used as a valve for controlling an important plant amount. Even if a break occurs in one of the servo coils, the servo valve having a plurality of servo coils can control the servo valve by compensating the break in the servo coil using the other sound servo coils, and this can prevent a shutdown or a power swing of the plant, which in turn can improves the reliability of the operation.

In order to perform the compensation of servo coil break, it is necessary to detect occurrence of a break in the servo coils. In the past, detection of wire break in the servo coil has been detected by a control operation unit such as a microcomputer outputting a servo control voltage demand based on an opening degree difference between a target opening degree and a real opening degree of the servo valve. This technology is disclosed, for example, in Japanese Patent Application Laid-Open No.9-126351.

In addition, there is proposed a method in which a break detecting resistor is connected to a plurality of servo coils in common, and a break in the servo coil is detected by a voltage of the break detecting resistor.

Since the technology disclosed in Japanese Patent Application Laid-Open No.9-126351 detects a break in servo coils using the control operation unit such as a microcomputer, the detection is dependent on the operation cycle, and accordingly there is a problem in the high speed operability. Since the operation cycle (sampling cycle) is 50 ms to 100 ms, the technology can not cope with the requirement of 5 ms.

On the other hand, the technology of using the common break detection resistor to the plurality of servo coils has a problem in that when a failure occurs in the common break detection line, the function of break detection is lost.

SUMMARY OF THE INVENTION

An object of the present invention is to provide a control system and a control method for servo valve which can stably continue to control a servo valve when a break occurs in servo coils of a servo valve having a plurality of servo coils, and to provide a combined-cycle electric-power generating plant and a gas turbine plant having the control system for servo valve.

The present invention is characterized by that a break in a servo coil is detected by a voltage in each of a plurality of servo coils.

A preferred embodiment of the present invention is that detection of wire break in the servo coil and compensation of wire break are performed by servo amplifiers.

That is, since a break in the servo coil is detected by a voltage in each of a plurality of servo coils, the break can be instantaneously detected. Further, since the compensation of wire break in the servo coil is performed by sharing the load current of the broken servo coil among the unbroken servo coils, the control of servo valve can be stably continued.

DETAILED DESCRIPTION

Figure 1:
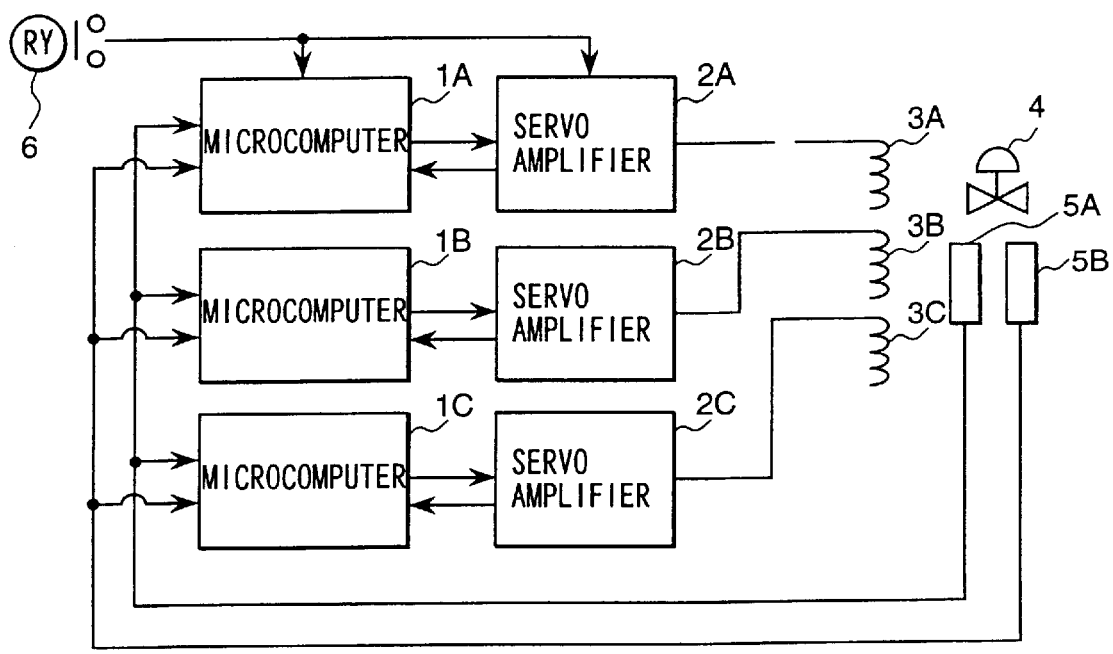
FIG. 1 is a block diagram showing an embodiment in accordance with the present invention.
Figure 2:
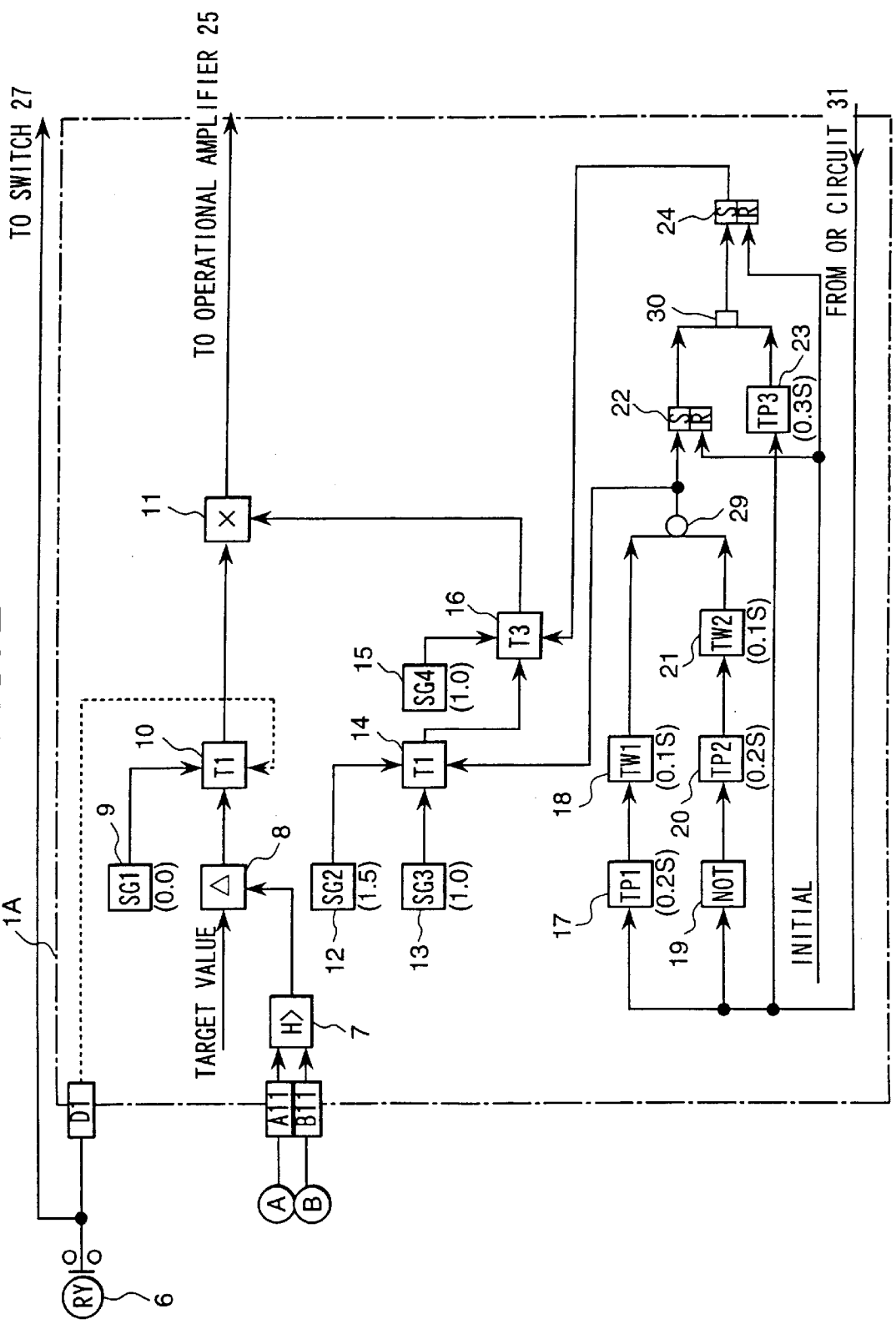
FIG. 2 is a detailed block diagram showing an example of the microcomputer of FIG. 1.
Figure 3:
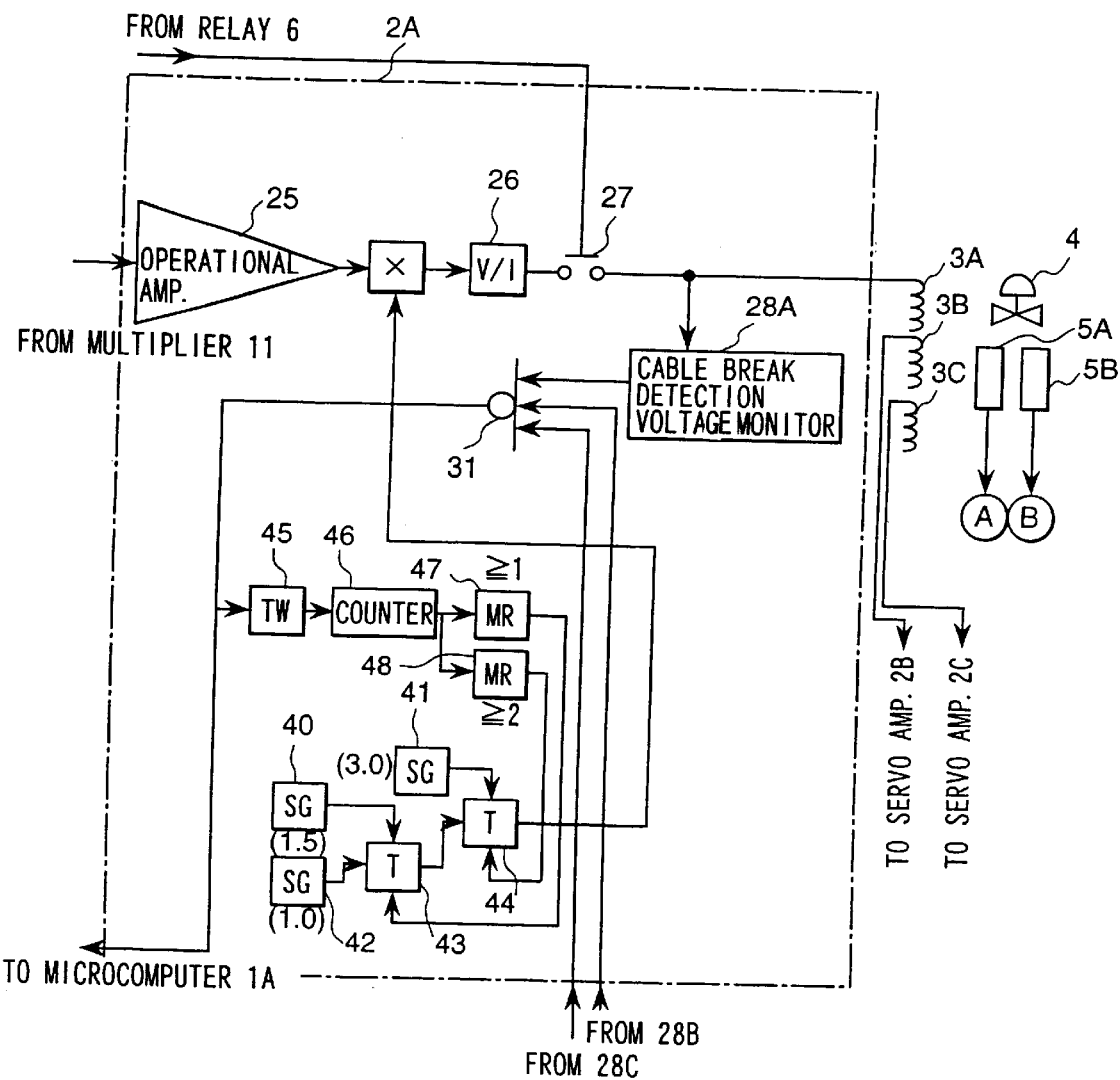
FIG. 3 is a detailed block diagram showing an example of the servo amplifier of FIG. 1.

An embodiment of the present invention is shown in FIG. 1 to FIG. 3. FIG. 1 is a block diagram showing the embodiment in accordance with the present invention. FIG. 2 is a detailed block diagram showing an example of the microcomputer of FIG. 1. FIG. 3 is a detailed block diagram showing an example of the servo amplifier of FIG. 1. Therein, the detailed block diagrams of the examples shown be FIG. 2 and FIG. 3 are the same structures for the microcomputers 1B, 1C and the servo amplifiers 2B, 2C, respectively.

In FIG. 1, the microcomputer 1A, the servo amplifier 2A and the servo coil 3A are connected so as to form one set, and the microcomputer 1B, the servo amplifier 2B and the servo coil 3B are connected so as to form one set, and the microcomputer 1C, the servo amplifier 2C and the servo coil 3C are connected so as to form one set. Although FIG. 1 shows the example of three servo coils 3A to 3C, the present invention is not limited to three servo coils, and can be applied to a case of two servo coils or a case of four or more servo coils.

The embodiment will be explained by taking the set of the microcomputer 1A, the servo amplifier 2A and the servo coil 3A.

Real opening degrees AI1, BI1 of the servo valve 4 are input to the microcomputer 1A shown in FIG. 2 from the opening meters 5A, 5B, and a practical opening value is selected by a high-value selector 7, and a control command based on a difference between a preset target value and an opening degree signal output from the high-value selector 7 is generated by a difference calculator 8, and then the control command is transmitted to the servo amplifier 2A by outputting it to an operational amplifier 25 shown in FIG. 3.

Therein, in a switch (T1) 10 shown in FIG. 2, when a state D1 for starting servo valve control is input from a control start relay 6 to bring the switch (T1) 10 in a starting state (the relay contact is ON), the output from the difference calculator 8 is selected to bring the system to the control mode state. When the control start relay 6 is OFF state (the relay contact is OFF), the switch 10 selects an output of a constant value generator 9 to keep the command to the servo valve 3A in an initial state, that is, a full-open or full-close state.

The command to the operational amplifier 25 is operated by a multiplier 11 to be output as a servo control command. In the servo amplifier 2A, the operational amplifier 25 receiving the servo control command transmits the output to a voltage/current converter 26 to convert the voltage to a current to be output.

A contact signal of the control start relay 6 is input to a switch 27, and the current is output to the servo coil 3A if the control start relay 6 is in ON-state to turn the switch 27 ON.

Similarly, in the B system of the microcomputer 1B, the servo amplifier 2B and the servo coil 3B, a current is output to the servo coil 3B by the microcomputer 1B and the servo amplifier card 2B. In the C system of the microcomputer 1C, the servo amplifier 2C and the servo coil 3C, a current is also output to the servo coil 3C by the microcomputer 1C and the servo amplifier card 2C.

Thus, the servo valve 4 is driven by the sum of the current signals individually output to the servo coil 3A, the servo coil 3B and the servo coil 3C.

Therein, the servo amplifiers 2A to 2C may be mounted on a single card.

Figure 4:
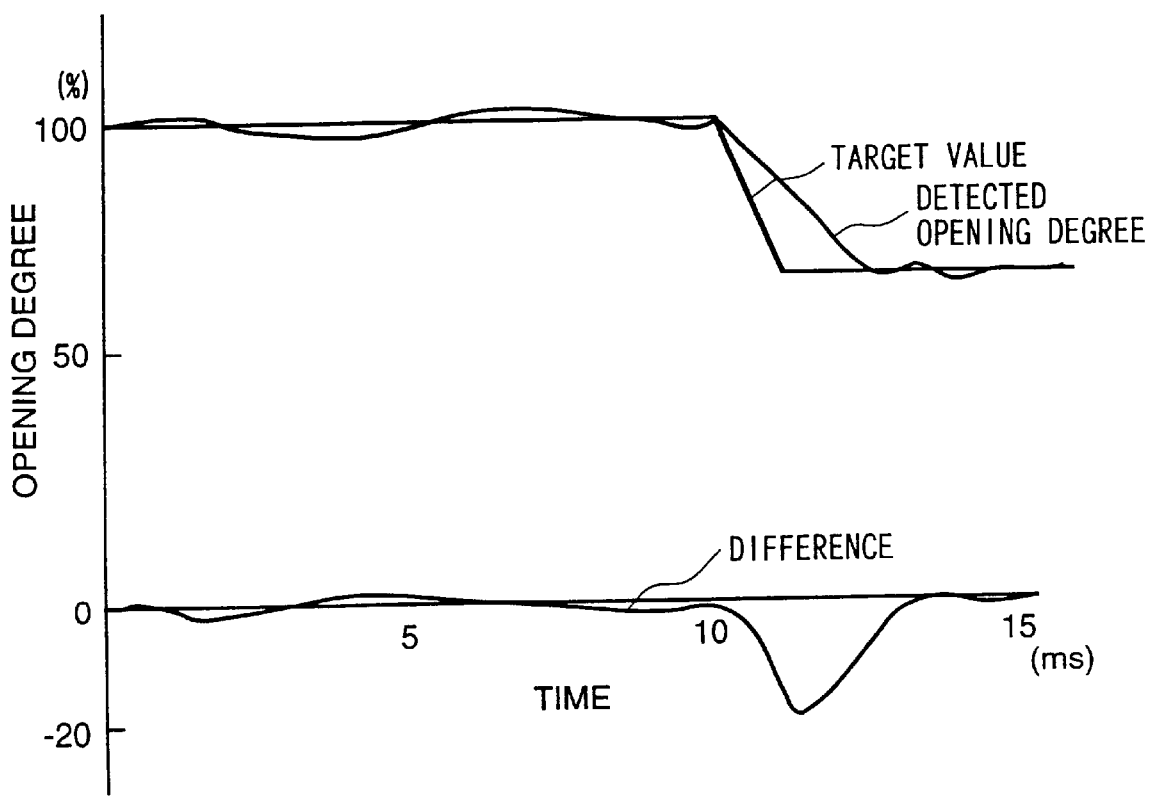
FIG. 4 is a graph explaining operation of the present invention.

FIG. 4 is shows an example of the characteristic of an operation result executed by the microcomputer 1. The difference (mA) between the target value (mA) and a current value corresponding to the detected opening degree (%) value output from the high-value selector 7 is calculated by the difference calculator 8, and the magnitude of the calculation result of difference is output to the servo amplifier 2A as the servo control command.

Figure 5:
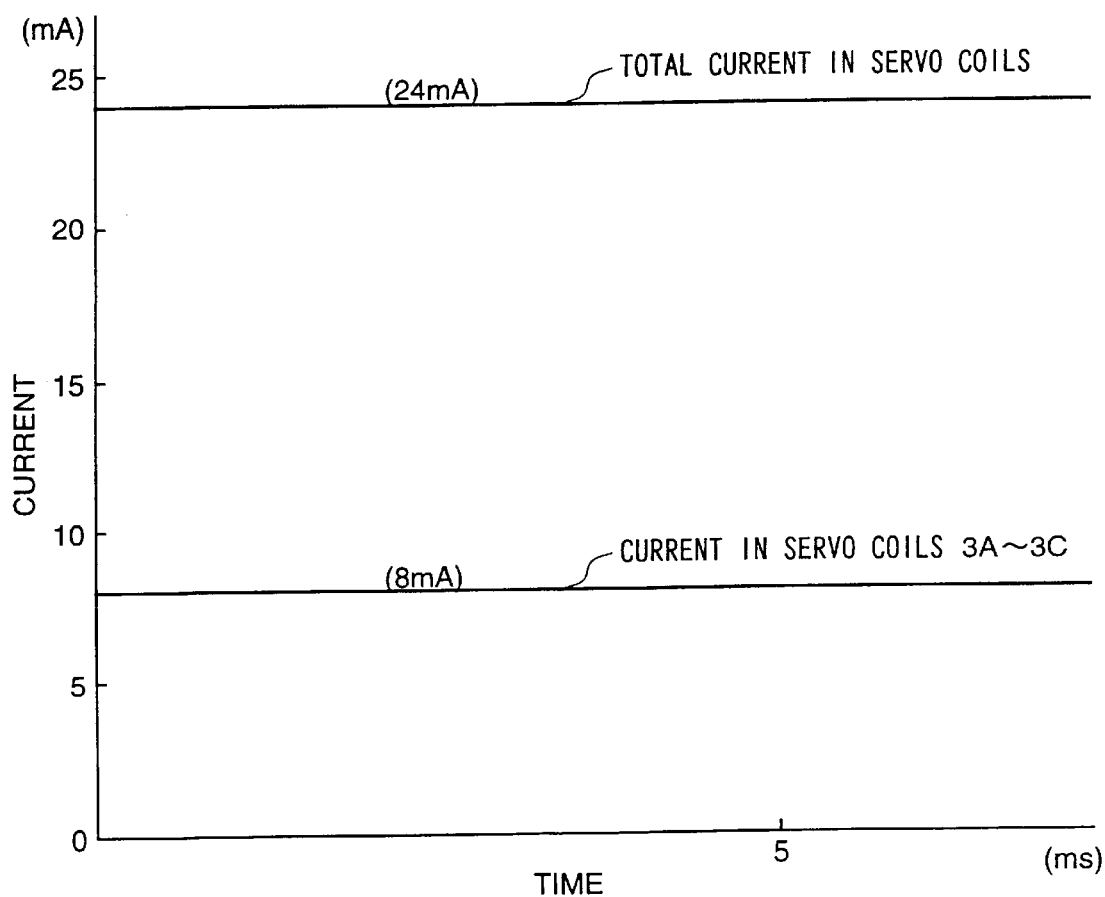
FIG. 5 is a graph explaining operation of the present invention.

FIG. 5 shows an example of changes in current flowing in the servo coils 3A to 3C and changes in total current flowing in the servo coils. The differences obtained from calculations in the microcomputers 1A to 1C are input to the servo amplifiers 2A to 2C, and currents are out put to the servo coils 3A to 3C, respectively. The servo coils 3A to 3C receive the output currents having a current error of ±8 mA and a voltage of 1V to 5V from the servo amplifiers 2A to 2C to drive the servo valve 4. That is, when the real opening value is equal to the target value, the current outputs of the servo amplifiers 2A to 2C are 0, and the servo valve 4 is in balance by 3V (assuming that the resistance of each coil is 375Ω, a value of current flowing in it is 8 mA) per one servo coil 3 (the total voltage value is 9V by the three coils 3A, 3B, 3C, and the total current value is 24 mA).

The detection of wire break and the compensation of wire break in a case of a break in one servo coil will be described below.

Referring to FIG. 3, if a wire break occurs in the servo coil 3A, the wire break is detected by a wire break detection voltage monitoring part 28A which monitors voltage of a current loop formed up to the servo coil 3A by the current output from the voltage/current converter 26. That is, the wire break is detected by a voltage drop of the wire break detection voltage monitoring part 28A when the wire break occurs in the servo coil 3A. The operational principle of the wire break detection by the voltage monitoring of the current loop is obvious from the Ohm's law.

After the wire break detection voltage monitoring part 28A detects the wire break, an OR circuit 31 transmits a wire break detection signal expressing the servo coil 3A being broken from the servo amplifier 2A to the microcomputer 1A. In the microcomputer 1A, by the wire break detection signal of the OR circuit 31, a pickup timer 17 and a weight timer 18 shown in FIG. 2 execute operation to memorize the first wire break in a flip-flop 22.

Although the case of occurrence of a wire break in the servo coil 3A is explained above, in a case of occurrence of a wire break in the servo coil 3B or 3C the similar operation is performed by the microcomputer 1B or 1C and the servo amplifier 2B or 2C.

In the case of occurrence of the wire break in the servo coil 3A, the switches 14 of the microcomputers 1B, 1C select 1.5 as the constant from the constant value generators 12 by the output of the OR circuits 29 to multiply the servo control command by 1.5 using the multipliers 11. That is, in a case where a wire break occurs in one of the servo coils 3A to 3C (in this case, 3A), the control command is increased to 1.5 times of the normal value in the microcomputers 1.

In the servo amplifier 2A, the output of the weight timer 45 of the first wire break is memorized in a counter 46 (the first wire break is 1) to hold a monitor relay 47. The operation of the compensation of wire break is performed by selecting the gain 1.5 of the constant value generator 40 using the switch 43 and by multiplying the output of the operational amplifier 25 by 1.5 using the multiplier 49.

Figure 6:
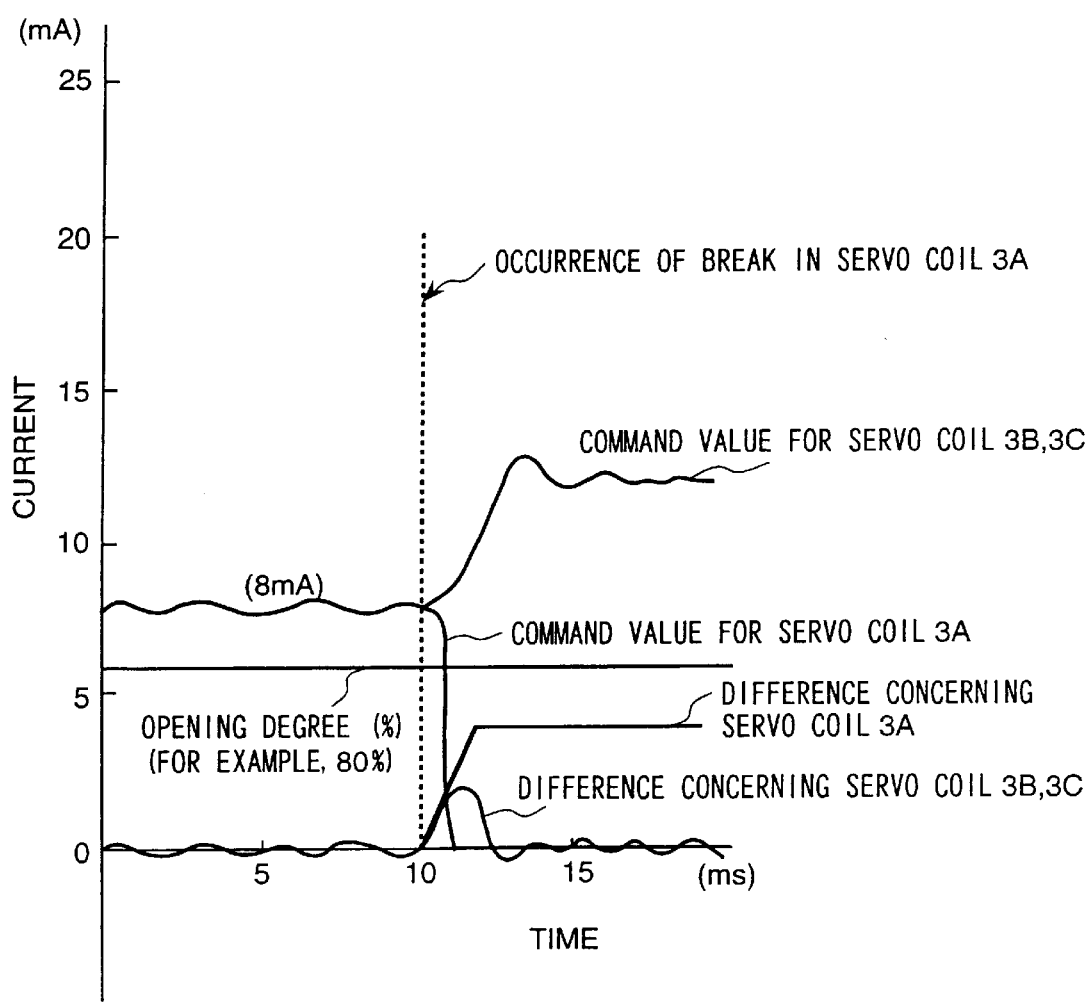
FIG. 6 is a graph explaining operation of the present invention.
Figure 7:
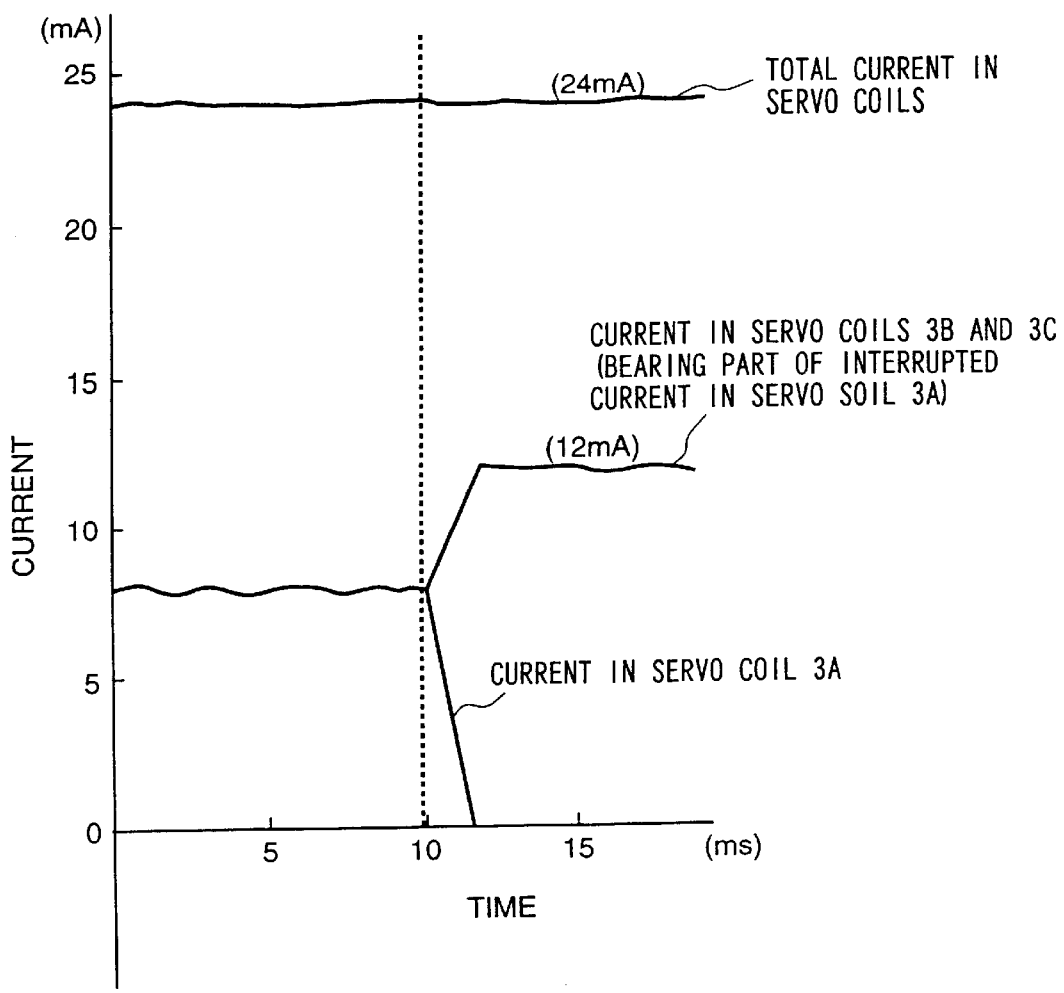
FIG. 7 is a graph explaining operation of the present invention.

Therein, FIG. 6 shows the control characteristics in the case where the wire break occurs in the servo coil 3A. FIG. 7 shows the characteristics of the operation of voltage signal in the servo amplifier 2A and the output to the servo valve 4 at compensating the wire break.

It is clear from FIG. 7 that the output of the servo coil 3A is decreased because the wire break occurs in the servo coil 3A, but the outputs of the servo coil 3B and the servo coil 3C are increased by the gain of 1.5, and accordingly the output of the servo valve 4 is not changed and kept in a state similar to the state of three coils alive. That is, as shown in FIG. 6, by increasing values of the respective control commands for the servo coils 3B and 3C to 12 mA, the opening degree (%) of the servo valve 4 can be kept constant.

Next, it is assumed that a wire break occurs in the servo coil 3B under a state where control is being performed using the servo coil 3B and the servo coil 3C. In this case, the wire break is detected by the wire break detection voltage monitoring part 28B of the servo amplifier 2B, similarly to the wire break of the servo coil 3A. After the wire break detection voltage monitoring part 28B detects the wire break, the OR circuit 31 shown in FIG. 3 transmits a wire break detection signal expressing occurrence of the second wire break of the three coils from the servo amplifier 2B to the microcomputer 1B.

In the microcomputer 1B, by the wire break detection signal of the OR circuit 31 of the servo amplifier 2B, the flip-flop 33 memorizing the first wire break and a time pickup 23 holds an AND circuit 30. The switch 16 selects 3.0 from the constant value generator 15 to multiply the servo control command by 3.0 using the multiplier 11.

Figure 8:
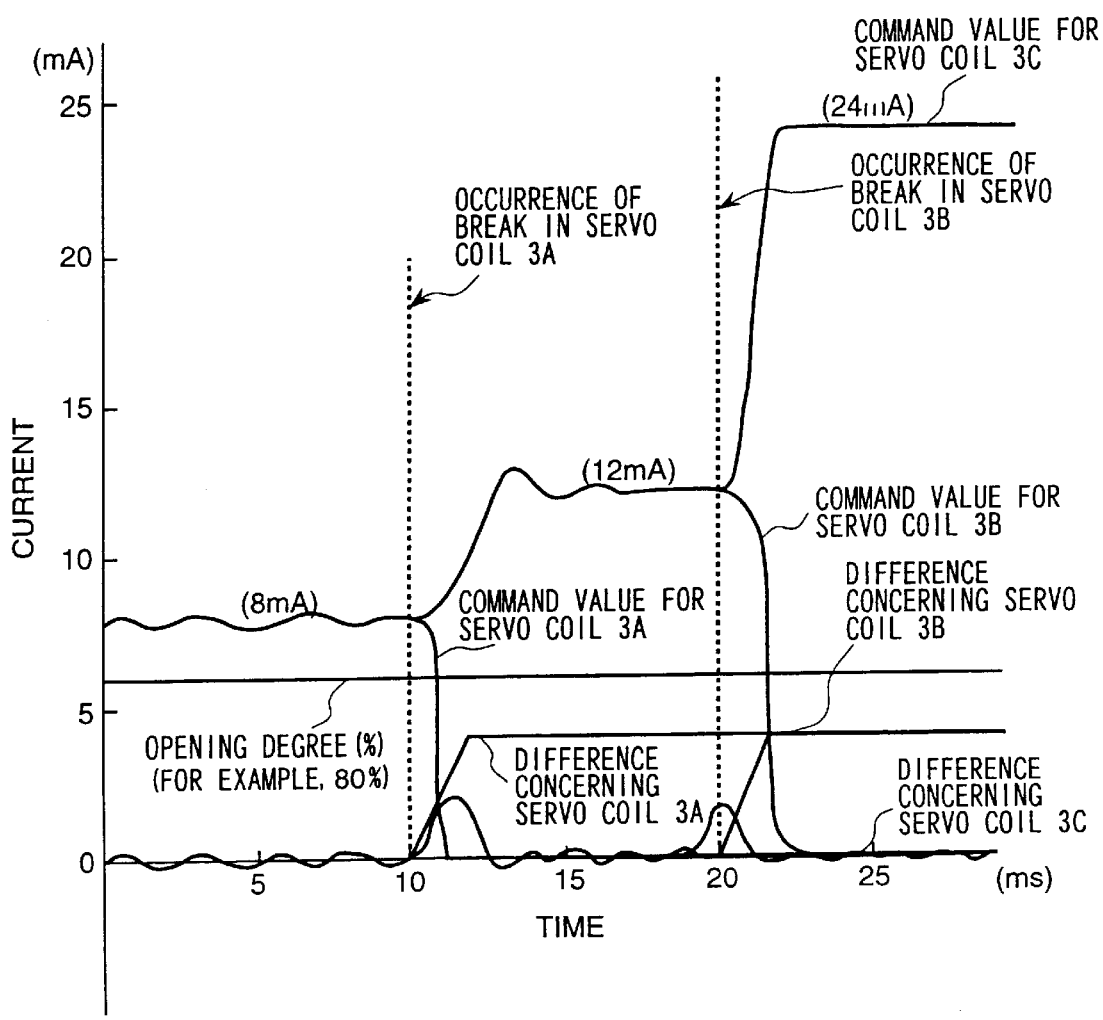
FIG. 8 is a graph explaining operation of the present invention.
Figure 9:
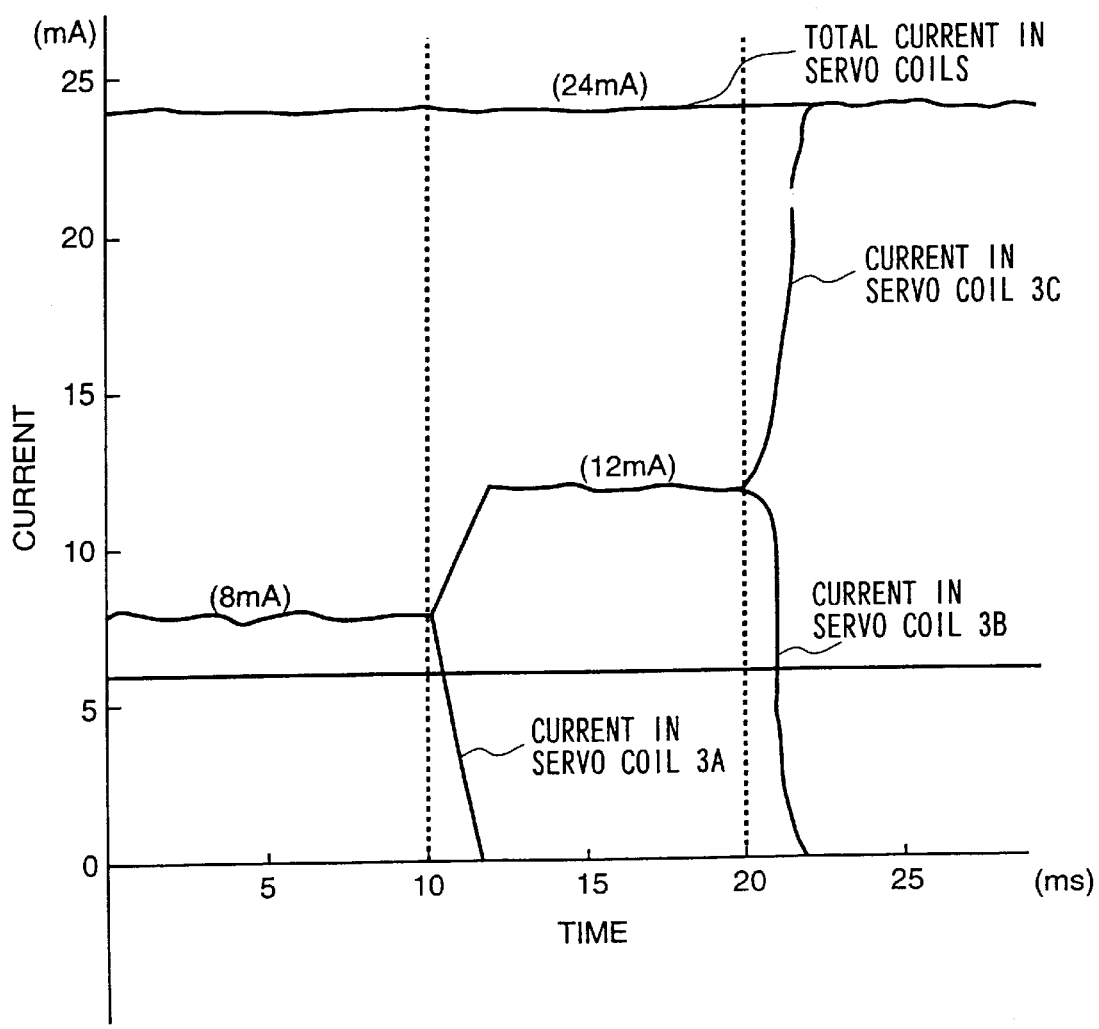
FIG. 9 is a graph explaining operation of the present invention.

FIG. 8 and FIG. 9 show the control characteristics in the case where the wire break further occurs in the servo coil 3B. At occurring of the wire break in the servo coil 3B, the control command is increased to 3.0 times of the normal value in the microcomputers 1, and at the same time the second wire break is memorized in the counter 46 (the second wire break is 2) in the servo amplifier 2B. Further, the switch 44 selects the gain 3.0 of the constant value generator 41 by holding of a monitor relay 48. The servo control command of the servo amplifier 25 is multiplied by 3.0 by the multiplier 49 to perform operation of the compensation of the wire break. It can be understood from FIG. 9 that the output of the servo coil 3B is decreased because of occurrence of the wire break, but the output of the servo coil 3C is increased by the gain of 3.0, and accordingly the total output of the servo valve 4 is not changed. That is, as shown in FIG. 8, by increasing the value of the control command for the servo coil 3B to 24 mA, the opening degree (%) of the servo valve 4 can be kept constant.

Figure 10:
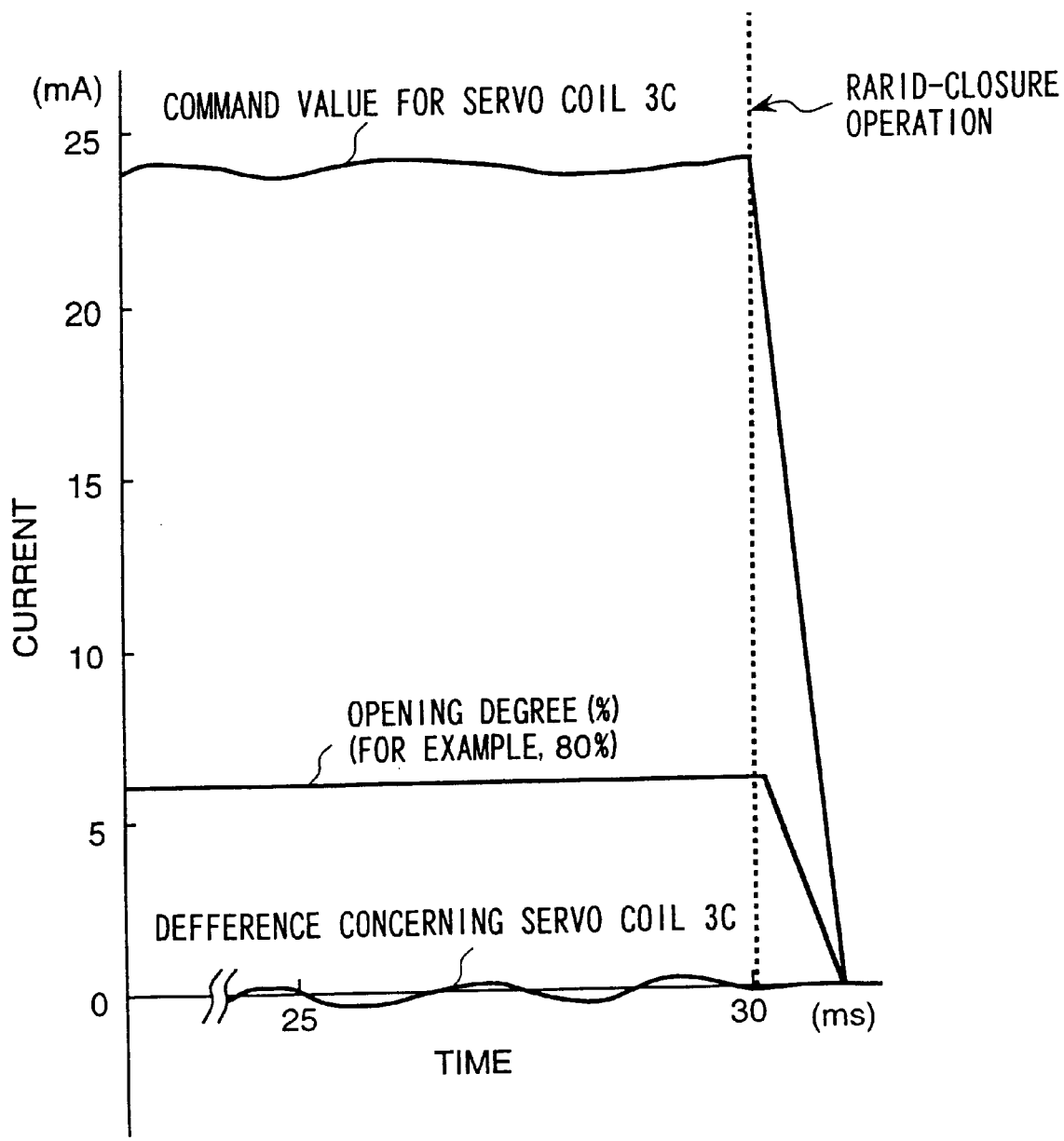
FIG. 10 is a graph explaining operation of the present invention.
Figure 11:
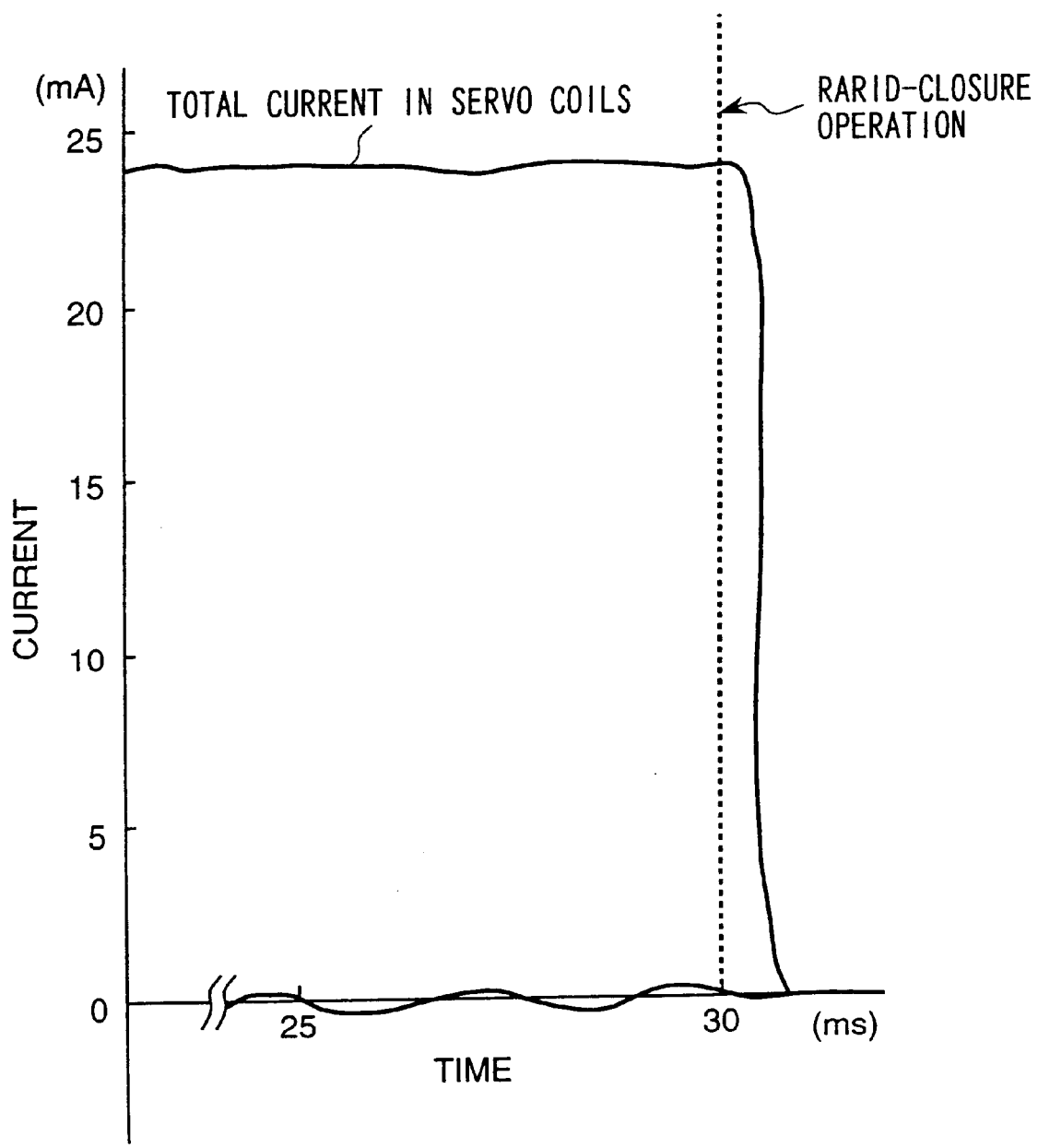
FIG. 11 is a graph explaining operation of the present invention.

In order to perform a rapid closing (or rapid opening) operation of the servo valve 4, the output of the servo coil 3C is changed to 0. That is, the control start relay 6 in the microcomputer 1C is switched OFF. Since the switch (T1) 10 selects 0 of the output of the constant value generator 9, the servo control command of the microcomputer 1 rapidly falls to 0, as shown in FIG. 10. Therefore, the servo amplifier 2C generates a fully-closing output, and the servo valve 4 is rapidly closed, as shown in FIG. 11.

The servo valve is controlled as described above. Since a break in the servo coil is detected by a voltage in each of a plurality of servo coils, the break can be instantaneously detected. Further, since the compensation of wire break in the servo coil is performed by sharing the load current of the broken servo coil among the unbroken servo coils, the control of servo valve can be stably continued.

Further, in the above embodiment, when operation of rapid closing or rapid opening of the servo valve is required, the operation time of the servo valve can be shortened by directly inputting the condition to the servo amplifier. Therein, at that time when the servo valve is fully closed or fully opened, the load current applied to the servo coils does not continue to be supplied to the servo coils, but is interrupted. Therefore, the life time of the coils can be extended.

As described above, since a break in the servo coil is detected by a voltage in each of a plurality of servo coils, the break can be instantaneously detected. Further, since the compensation of wire break in the servo coil is performed by sharing the load current of the broken servo coil among the unbroken servo coils, the control of servo valve can be stably continued.

Description will be made below on a case where the control system for servo vale described above is applied to a combined-cycle electric-power plant.

Figure 12:
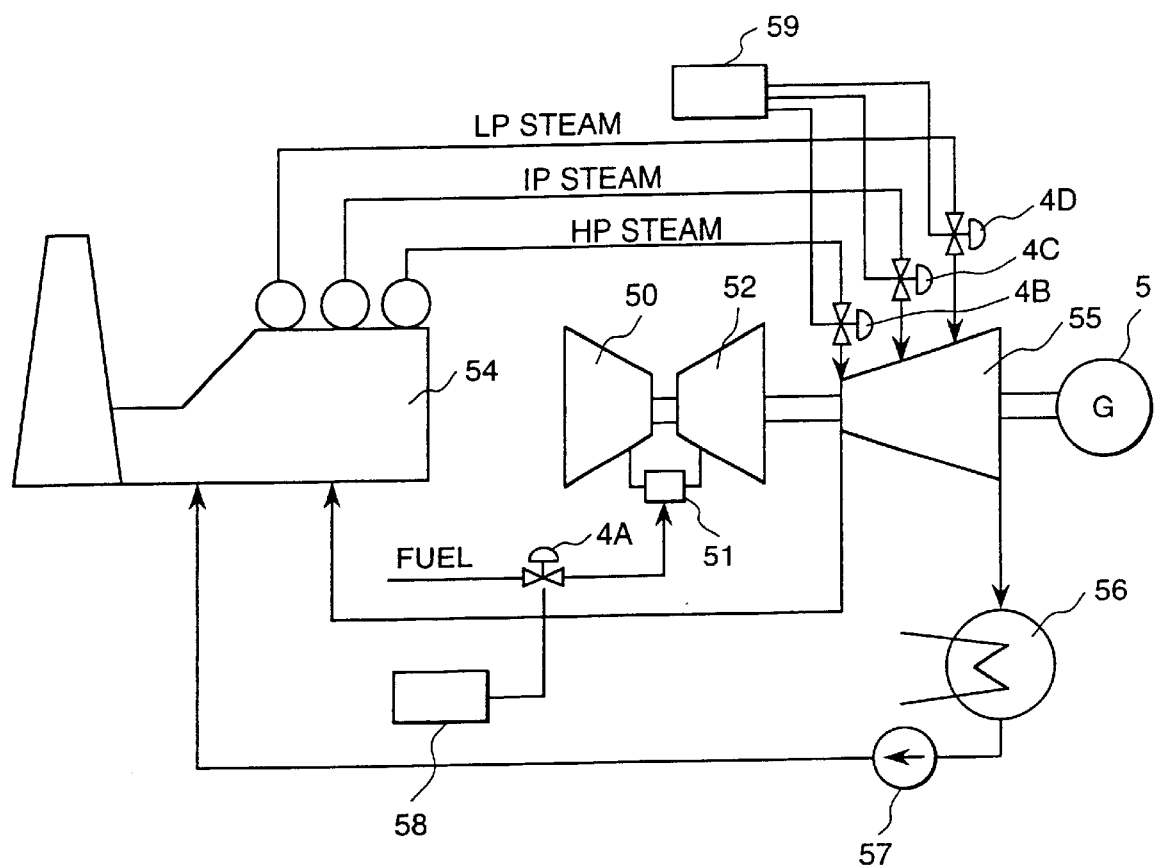
FIG. 12 is a system diagram showing a combined-cycle electric-power generating plant to which the control system foe servo valve in accordance with the present invention is applied.

FIG. 12 is a system diagram showing an embodiment of a combined-cycle electric-power generating plant. Referring to FIG. 12, the combined-cycle electric-power generating plant comprises a gas turbine unit composed of a compressor 50 for compressing air, a combustor 51 for burning a gasified fuel such as LNG or the like, and a turbine 52 which is driven by burned gas obtained by mixing the air compressed by the compressor 50 and the burned gas burned by the combustor 51; a generator 53 linked to the gas turbine; an exhaust heat recovery boiler 54 for generating steam using high temperature exhaust gas exhausted from the gas turbine 52; and a steam turbine 55 driven by the generated steam from the exhaust heat recovery boiler 54, and further comprises a condenser for condensing steam from the steam turbine 55 and a pump 57 for feeding condensate water to the exhaust heat recovery boiler 54.

In the combined-cycle electric-power plant shown by FIG. 12, the gas turbine system and the steam turbine 55 are coaxially linked to the generator 53 in order to make the plant compact. However, there are some cases where the gas turbine system and the steam turbine 55 are separately linked to individual generators.

In the combined-cycle electric-power plant, a servo valve 4A is placed in a pipe for conveying the gasified fuel such as LNG or the like to the combustor 51. The servo valve 4A is controlled by a gas turbine control unit 58, but the gas turbine control unit 58 is constructed so as to include the control system for servo valve described in FIG. 1 to FIG. 3.

Similarly, servo valves 4B, 4C, 4D are individually placed in pipes conveying generated steam from the exhaust heat recovery boiler 54 to the steam turbine unit 55. The servo valves 4B, 4C, 4D are controlled by a steam turbine control unit 59, but the steam turbine control unit 59 is constructed so as to include the control system for servo valve described in FIG. 1 to FIG. 3.

By applying the servo valve control system as described above, since a break in the plurality of servo coils exciting to operate closing and opening each of the servo valves 4A to 4D is detected by a voltage in each of a plurality of servo coils, the break can be instantaneously detected. Further, since the compensation of wire break in the servo coil is performed by sharing the load current of the broken servo coil among the unbroken servo coils, the control of servo valve can be stably continued. Therefore, the combined-cycle electric-power generating plant can be stably operated.

Description will be made below on a case where the control system for servo vale described above is applied to a gas turbine plant.

Figure 13:
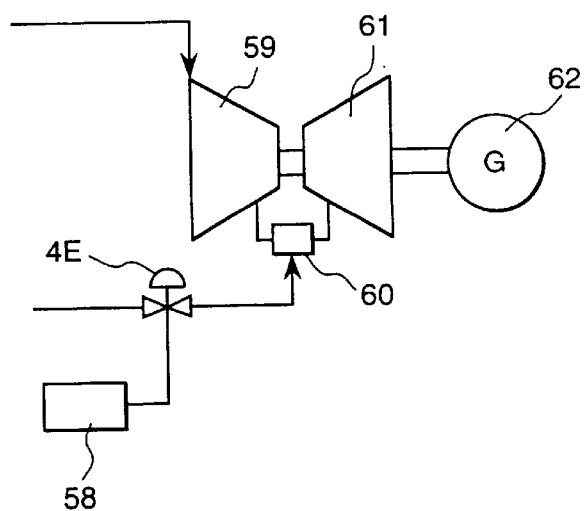
FIG. 13 is a system diagram showing a gas turbine plant to which the control system foe servo valve in accordance with the present invention is applied.

FIG. 13 is a system diagram showing an embodiment of a gas turbine plant. Referring to FIG. 13, the gas turbine plant comprises a compressor 59 for compressing air; a combustor 60 for burning a gasified fuel such as LNG or the like; a turbine 61 which is driven by burned gas obtained by mixing the air compressed by the compressor 59 and the burned gas burned by the combustor 60; and a generator 62 linked to the gas turbine 61.

In the gas turbine plant, a servo valve 4E is placed in a pipe for conveying the gasified fuel such as LNG or the like to the combustor 60. The servo valve 4E is controlled by a gas turbine control unit 63, but the gas turbine control unit 63 is constructed so as to include the control system for servo valve described in FIG. 1 to FIG. 3.

By applying the servo valve control system as described above, since a break in the plurality of servo coils exciting to operate closing and opening the servo valve 4E is detected by a voltage in each of a plurality of servo coils, the break can be instantaneously detected. Further, since the compensation of wire break in the servo coil is performed by sharing the load current of the broken servo coil among the unbroken servo coils, the control of servo valve can be stably continued. Therefore, the gas turbine plant can be stably operated.

What is claimed is:

1. A method for controlling a servo valve with a control system, the servo valve having a plurality of servo coils, the servo valve being excited by said servo coils, the method comprising:

outputting a servo control voltage command based on an opening degree difference between a target opening degree and a real opening degree of said servo valve;

converting said servo control voltage command to current to excite said plurality of servo coils to a predetermined current value and to perform compensation of servo coil breaks;

detecting a break in one of said servo coils by detecting a change of voltage of each of said plurality of servo coils; and increasing the servo control voltage command to compensate for the detected break in one of said servo coils.

2. A method for controlling a servo valve with a control system according to claim 1, comprising increasing a gain of the servo-control voltage command, when a wire break is detected.

3. A method for controlling a servo valve with a control system according to claim 1, wherein the compensation of a servo coil break is performed based on detecting a break in any servo coil among said plurality of servo coils.

4. A method for controlling a servo valve with a control system according to claim 1, wherein said servo control voltage command is multiplied by a predetermined constant based on detecting a break in any of said servo coils.

5. A method for controlling a servo valve with a control system according to claim 1, wherein the servo control voltage command is generated by a microcomputer.

6. A method for controlling a servo valve with a control system according to claim 1, wherein converting the servo control voltage command is performed by a servo amplifier which includes a function of voltage monitoring for detecting a wire break.

7. A method for controlling a servo valve with a control system according to claim 1, wherein converting the servo control voltage command is performed by a servo amplifier which amplifies the voltage command from the controller and then converts the amplified voltage into a current.

8. A method for controlling a servo valve with a control system, the servo valve having three servo coils, the servo valve being excited by said servo coils, the method comprising:

outputting a servo control voltage command for each of said servo coils based on an opening degree difference between a target opening degree and a real opening degree of said servo valve;

converting said servo control voltage command to current to individually excite each of said three servo coils to a predetermined current value and to perform compensation of servo coil breaks;

detecting a break in one of said servo coils by detecting a change of voltage of each of said three servo coils; and increasing the servo control voltage command to compensate for the detected break in one of said servo coils.

9. A method for controlling a servo valve with a control system according to claim 8, wherein the compensation of a servo coil break is performed based on detecting a break in any servo coil among said three servo coils.

10. A method for controlling a servo valve with a control system according to claim 8, wherein said servo control voltage command is multiplied by a predetermined constant based on detecting a break in any servo coil among said three servo coils.

11. A method for controlling a servo valve with a control system according to claim 8, wherein the servo control voltage command is generated by a microcomputer.

* * * * *